United States Patent
Trifoni et al.

(10) Patent No.: US 7,666,536 B2
(45) Date of Patent: Feb. 23, 2010

(54) MEMBRANE ELECTROCHEMICAL GENERATOR

(75) Inventors: Eduardo Trifoni, Napoli (IT); Daniele Facchi, Rovato (IT); Gian Piero Fleba, Milan (IT); Matteo Lenardon, Lomazzo (IT); Marcello Liotta, Rozzano (IT); Luca Merlo, Montorfano (IT); Ruben Ornelas Jacobo, San Giuliano Milanese (IT); Antonino Toro, Milan (IT); Fabio Traini, Milan (IT)

(73) Assignee: Nuvera Fuel Cells Europe S.R.L., Milan (IT)

( * ) Notice: Subject to any disclaimer, the term of this patent is extended or adjusted under 35 U.S.C. 154(b) by 426 days.

(21) Appl. No.: 10/517,982

(22) PCT Filed: Jun. 16, 2003
(Under 37 CFR 1.47)

(86) PCT No.: PCT/EP03/06327

§ 371 (c)(1),
(2), (4) Date: Dec. 13, 2004

(87) PCT Pub. No.: WO03/107465

PCT Pub. Date: Dec. 24, 2003

(65) Prior Publication Data

US 2007/0196710 A1    Aug. 23, 2007

(30) Foreign Application Priority Data

Jun. 17, 2002    (IT)    .......................... MI2002A1338

(51) Int. Cl.
H01M 8/04    (2006.01)
H01M 8/12    (2006.01)
H01M 2/14    (2006.01)

(52) U.S. Cl. ............................. 429/26; 429/38; 429/39
(58) Field of Classification Search .................. 429/26, 429/38, 39
See application file for complete search history.

(56) References Cited

U.S. PATENT DOCUMENTS 5,482,792 A  *  1/1996  Faita et al. ..................... 429/30

(Continued)

FOREIGN PATENT DOCUMENTS

EP    1 286 404    2/2003

(Continued)

OTHER PUBLICATIONS

Executed Certification of Robert Ellenberger Shillenn dated May 14, 2008, of English translation (3 pgs.) of French Document XP-000969027.(2 pgs.).

Primary Examiner—Patrick Ryan
Assistant Examiner—Eugenia Wang
(74) Attorney, Agent, or Firm—Finnegan, Henderson, Farabow, Garrett & Dunner, L.L.P.

(57) ABSTRACT

The present invention relates to a membrane electrochemical generator (200) formed by a multiplicity of reaction cells (201) mutually connected in electrical series and assembled according to a bipolar configuration. In accordance with the present invention, the thermal management of the membrane electrochemical generator (200) and the hydration of the membrane (204) are ensured by the injection of a cooling fluid, preferably liquid water, in the gaseous reactant feed. Such an injection takes place through a multiplicity of calibrated fluid injection holes (230) obtained in conductive bipolar plates (203) delimiting the reaction files (201). The cooling fluid can be preheated by passing through a collector/distributor structure (206) located in an additional cell (202).

21 Claims, 10 Drawing Sheets

U.S. PATENT DOCUMENTS 5,998,054 A * 12/1999 Jones et al. .................... 429/34
2002/0142201 A1 * 10/2002 Nelson ........................ 429/26
2003/0039875 A1 * 2/2003 Horiguchi et al. ............. 429/26

FOREIGN PATENT DOCUMENTS

| WO | WO 00/63992 | 10/2000 |
| WO | WO00/63992 A1 * | 10/2000 |
| WO | WO 00/70698 | 11/2000 |

* cited by examiner

MEMBRANE ELECTROCHEMICAL GENERATOR

This application is a 371 of PCT/EP03/06327 filed Jun. 16, 2003.

DESCRIPTION OF THE INVENTION

The present invention relates to a membrane electrochemical generator with direct injection of liquid water into the gaseous reactants.

Processes of conversion of chemical energy to electric energy based on membrane electrochemical generators are known in the art.

In general, a membrane electrochemical generator is formed by a multiplicity of reaction cells mutually connected in electrical series and assembled according to a bipolar configuration.

Each reaction cell converts the chemical energy generated during the reaction of a fuel with an oxidant without degrading it completely to thermal energy, and therefore without being subject to the limitations of Carnot's cycle. More specifically, the fuel is supplied to the anodic chamber of the reaction cell and consists for instance of a hydrogen-rich gaseous mixture or of solutions of light alcohols, such as methanol or ethanol, while the oxidant is supplied to the cathodic chamber of the same cell and consists for instance of air or oxygen.

The fuel is catalytically electro-oxidised in the anodic chamber releasing protons $H^+$ and electrons $e^-$ which are consumed in the cathodic chamber through a catalytic reaction of oxidant electro-reduction, with production of water. A proton-exchange membrane which separates the anodic and the cathodic chamber allows the continuous flow of protons $H^+$ from the anodic chamber to the cathodic chamber while simultaneously hindering the passage of electrons $e^-$, which conversely takes place through an external electric circuit. In this way, the difference of electric potential established at the poles of the reaction cell is maximised.

The proton-exchange membranes commonly employed in membrane electrochemical generators consist of a chemically inert polymer, partially functionalised with groups capable of undergoing an acid-base hydrolysis in the presence of liquid water, with consequent separation of electrical charge. More precisely, the above hydrolysis consists of the release of positive ions (cations) and the formation of fixed negative charges on the polymer.

In order to maintain the proton-exchange membranes constantly hydrated so as to allow the hydrolysis and thus the separation of electrical charge permitting the protonic conduction to take place, the gaseous reactants (fuel and oxidant) are supplied to the electrochemical generator saturated with water vapour and at a temperature close to that of the reaction cells by means of expensive and complex saturation devices, placed outside the electrochemical generator itself.

The known electrochemical generators are also provided with suitable cooling devices which accomplish the withdrawal of the heat produced during the functioning of the generator itself, through thermal exchange with a circulating fluid (for instance deionised water). The heat must be efficiently withdrawn from the electrochemical generator to allow the thermal control thereof not only due to the limited thermal stability of the proton-exchange membranes, usually unfit for operating at temperatures above 100° C., but also to limit as far as possible the evaporation of the water produced in the course of the electro-reduction reaction and its consequent removal by the flow of inerts and unconverted reactants exiting the generator, with the consequent risk of membrane dry-out.

Nevertheless, the presence of these cooling devices renders the known electrochemical generators even more complex and expensive.

A known solution to prevent these inconveniences is disclosed in the international patent application WO 00/63992 to the same applicant, providing the direct injection of a calibrated flow of liquid water in a membrane electrochemical generator consisting of reaction cells having a reticulated material, of the type disclosed in U.S. Pat. No. 5,482,792, placed inside the anodic and cathodic chambers. The calibrated flow of liquid water, partially evaporating within the reticulated element taking advantage of the elevated surface development, simultaneously provides to humidifying the gaseous reactants while thermally controlling the electrochemical generator without making use of two distinct devices and thus limiting the costs and the complexity of the generator itself.

The above described solution, while being advantageous under many aspects, nonetheless presents a few inconveniences.

In particular, the direct injection of the calibrated flow of liquid water takes place peripherally to the active area of each reaction cell and transversally to the flow of gaseous reactants. Such a mode for direct injection of liquid water, due to the reduced momentum of the latter and to the adhesion phenomena to the walls of the sealing gaskets, may determine a non uniform distribution of water within the active area of each cell, with consequent formation of non moistened, hot and incipiently drying regions. This has the effect of provoking the membrane drying-out and thus the reduction of their operative lifetime besides hampering the mechanism of water evaporation, with consequent increment of the liquid water flow-rate necessary to the thermal control of the electrochemical generator.

The object of the present invention is to provide a membrane electrochemical generator free of the described drawbacks.

According to the present invention, a membrane electrochemical generator is realised as defined in claim 1.

Figure 1:
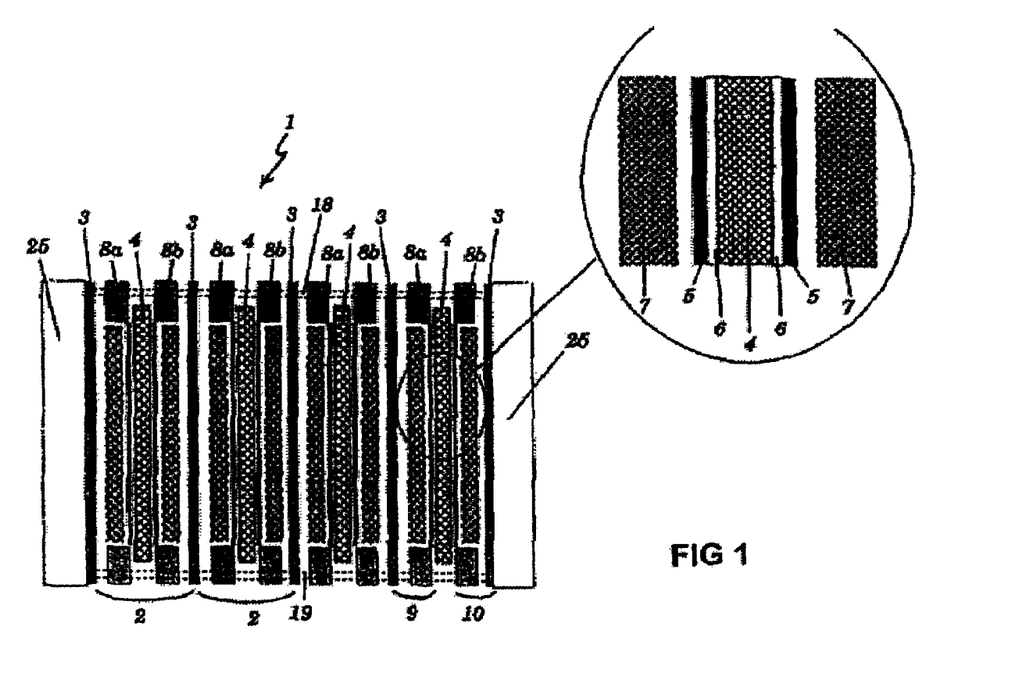
FIG. 1 shows an exploded side-view of a first embodiment of a membrane electrochemical generator according to the invention.

For a better understanding of the invention, an embodiment thereof is described below, as a mere non limiting example and making reference to the attached drawings, wherein:

FIG. 1 shows a first embodiment of a membrane electrochemical generator according to the invention. The electrochemical generator 1 comprises a multiplicity of reaction cells 2 mutually connected in series and assembled according to a filter-press type configuration.

More in detail, each reaction cell 2 is delimited by a pair of conductive bipolar plates 3, with planar faces, among which are comprised, proceeding outwards, the proton-exchange membrane 4; a pair of porous electrodes 5; a pair of catalytic layers 6 deposited at the interface between membrane 4 and each of the porous electrodes 5; a pair of current collectors/distributors 7, realised by means of a reticulated metallic element of the type described in U.S. Pat. No. 5,482,792, electrically connecting the conductive bipolar plates 3 to the porous electrodes 5 while simultaneously distributing the gaseous reactants; a sealing gasket pair 8a, 8b consisting of an anodic sealing gasket 8a and a cathodic sealing gasket 8b. The anodic sealing gasket 8a is directed to seal the periphery of the anodic chamber 9 of the reaction cell 2 in order to avoid the leakage of fuel (hydrogen in particular), while the cathodic sealing gasket 8b is directed to seal the periphery of the cathodic chamber 10 of the reaction cell 2 in order to avoid the leakage of oxidant (air in particular). The anodic and cathodic sealing gaskets 8a, 8b are also directed to realise the seat for the current collectors/distributors 7.

Figure 2:
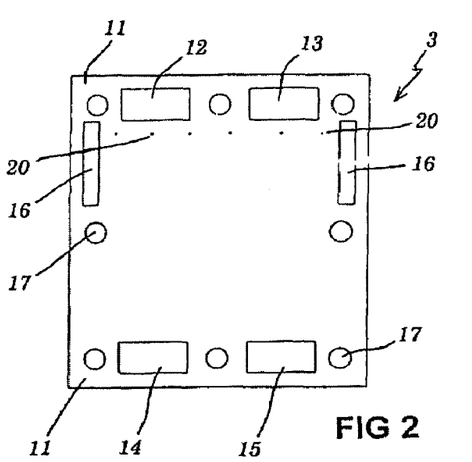
FIG. 2 shows a front-view of a component of the membrane electrochemical generator of FIG. 1.

As shown in FIG. 2, the conductive bipolar plates 3 have a substantially rectangular shape and each of them presents a perimetrical portion 11 provided with: first and second upper openings 12, 13 for the passage of the gaseous reactants, respectively fuel and oxidant; first and second lower openings 14, 15 for the discharge of the reaction products mixed with the optional residual reactants; side openings 16 for the passage of a cooling fluid, in particular liquid water. The perimetrical portion 11 is also provided with a multiplicity of holes 17 for the housing of tie-rods by means of which the tightening of the electrochemical generator 1 is accomplished.

During the assemblage of the electrochemical generator 1, the coupling between the first and the second upper openings 12, 13 of all the conductive bipolar plates 3 determines the formation of two upper longitudinal ducts 18 while the coupling between the first and the second lower openings 14, 15 of all the conductive bipolar plates 3 determines the formation of two lower longitudinal ducts 19. The two upper longitudinal ducts 18, only one of which is shown in FIG. 1, define the feeding manifolds of the gaseous reactants while the two lower longitudinal ducts 19, only one of which is shown in FIG. 1, define the discharge manifolds of the reaction products mixed with the optional residual reactants. Alternatively, the lower longitudinal ducts 19 can be employed as feeding manifolds, and the upper longitudinal ducts 18 as discharge manifolds. It is also possible to feed one of the two gaseous reactants through one of the upper longitudinal ducts 18, using the corresponding lower longitudinal duct 19 for the discharge and feeding the other gaseous reactant through the other lower longitudinal duct 19 using the corresponding upper longitudinal duct 18 for the discharge.

Moreover, the coupling between the side openings 16 of all the conductive bipolar plates 3 determines the formation of side ducts, not shown in FIG. 1, for the passage of the liquid water.

Each conductive bipolar plate 3 is also provided with a multiplicity of fluid injection calibrated holes 20, all having the same diameter (for instance comprised between 0.2 mm to 1 mm), through which the liquid water flowing in the side ducts of the electrochemical generator 1 is injected into the reaction cells 2, as will be better explained hereafter. The fluid injection calibrated holes 20 are mutually aligned in order to ensure a homogeneous distribution of the liquid water and are placed below the first and second upper openings 12, 13.

Figure 3A:
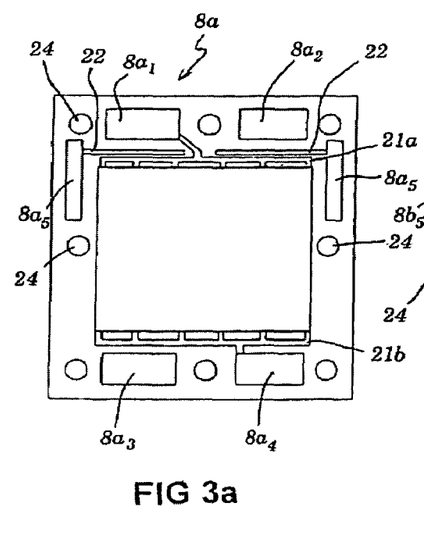
FIGS. 3a, 3b, 3c show front-views of embodiments of further components of the membrane electrochemical generator of FIG. 1.
Figure 3B:
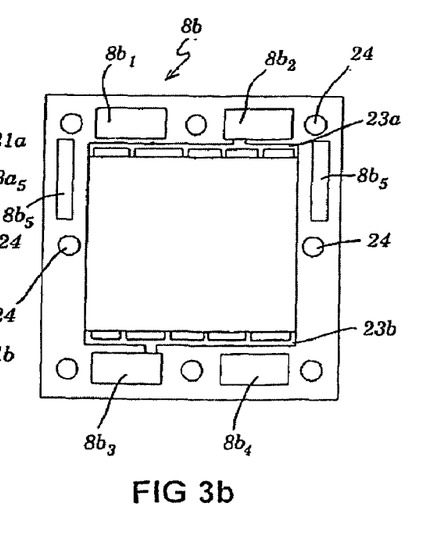
Figure 3C:
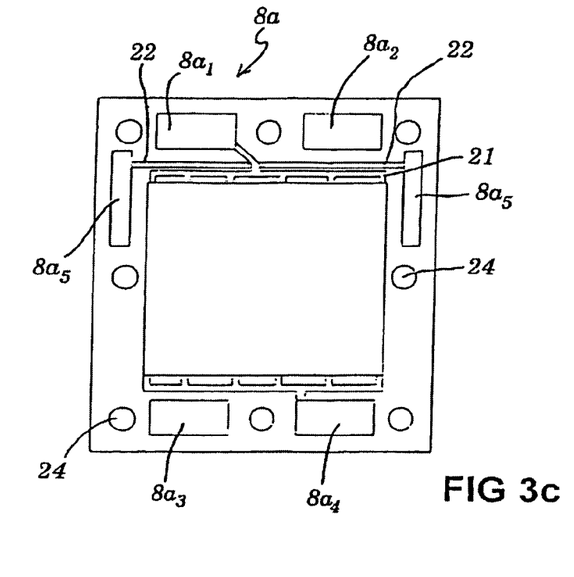

As shown in FIGS. 3a, 3b, 3c the anodic and cathodic sealing gaskets 8a, 8b of each reaction cell 2 have a substantially rectangular shape and present respective first and second upper openings $8a_1$, $8a_2$, $8b_1$, $8b_2$, for the passage of the gaseous reactants; respective first and second lower openings $8a_3$, $8a_4$, $8b_3$, $8b_4$, for the discharge of the reaction products mixed with the optional residual reactants; respective side openings $8a_5$, $8b_5$ for the passage of liquid water.

More in detail, the first upper openings $8a_1$ (through which the fuel passes) and the second lower openings $8a_4$ of the anodic gasket 8a are connected to the anodic chamber 9 through, respectively, distribution channels 21a and discharge channels 21b, obtained within the thickness of the same anodic sealing gasket (FIG. 3a). In their turn, the second upper openings $8b_2$ (through which the oxidant passes) and the first lower openings $8b_3$ of the cathodic sealing gasket 8b are connected to the cathodic chamber 10 respectively through the distribution channels 23a and the discharge channels 23b, obtained within the thickness of the same cathodic sealing gasket (FIG. 3b). The distributing and discharge channels 21a, 21b, 23a and 23b have a comb-like structure allowing them to distribute and collect within each reaction cell 2 the gaseous reactants and the reaction products, the latter mixed with the optional residual reactants, in a uniform fashion. The anodic sealing gasket 8a is also provided with fluid collection channels 22 connected with the side openings $8a_5$. Optionally, the fluid collection channels 22 can also be connected to the distribution channels 21a (FIG. 3c).

In a filter-press configuration, the first and the second upper openings $8a_1$, $8a_2$, $8b_1$, $8b_2$ of the anodic and cathodic sealing gaskets 8a, 8b form, in conjunction with the first and the second upper openings 12, 13 of the conductive bipolar plates 3 the two upper longitudinal ducts 18; the first and the second lower openings $8a_3$, $8a_4$, $8b_3$, $8b_4$ of the anodic and cathodic sealing gaskets 8a, 8b form, in conjunction with the first and the second lower openings 14, 15 of the conductive bipolar plates 3 the two lower longitudinal ducts 19; the side openings $8a_5$, $8b_5$ of the anodic and cathodic sealing gaskets 8a, 8b form, in conjunction with the side openings 16 of the conductive bipolar plates 3 the side ducts for the liquid water feed.

Moreover, in a filter-press configuration, the fluid collection channels 22 with which the anodic sealing gasket 8a is provided are placed in correspondence of the fluid injection calibrated holes 20 which in their turn are placed each in correspondence of a distribution channel 23a of the cathodic sealing gasket 8b.

The anodic and cathodic sealing gaskets 8a, 8b are also provided with a multiplicity of holes 24 for housing the tie-rods by means of which the tightening of the electrochemical generator 1 is accomplished.

In its turn, the electrochemical generator 1 is delimited by two conductive terminal plates 25 (FIG. 1), one of which is provided with nozzles, not shown in FIG. 1, for the hydraulic connection of the upper and lower longitudinal ducts 18 and 19 and of the side ducts. Furthermore, both the conductive terminal plates 25 are provided with appropriate holes (also not shown in FIG. 1) for housing the tie-rods.

Operatively, the flow of liquid water supplied through the side ducts of the electrochemical generator 1 flows in the fluid collection channels 22 of the anodic sealing gaskets 8a and from here, through the fluid injection calibrated holes 20, is injected in the cathodic reactive streams entering the adjacent reaction cells 2.

As an alternative, if the anodic sealing gaskets 8a have a structure equivalent to the one shown in FIG. 3b and the cathodic sealing gaskets 8b have a structure equivalent to the one shown in FIG. 3a the stream of liquid water flows in the fluid collection channels 22, in this case obtained within the cathodic sealing gaskets 8b, and from here, through the fluid injection calibrated holes 20, is injected in the anodic reactive streams entering the adjacent reaction cells 2.

In both cases, the thermal management of the electrochemical generator 1 and the humidification of the membrane 4 are performed by the evaporation of the liquid water flow across the reticulated metallic element which realises the current collector/distributor 7.

Figure 4:
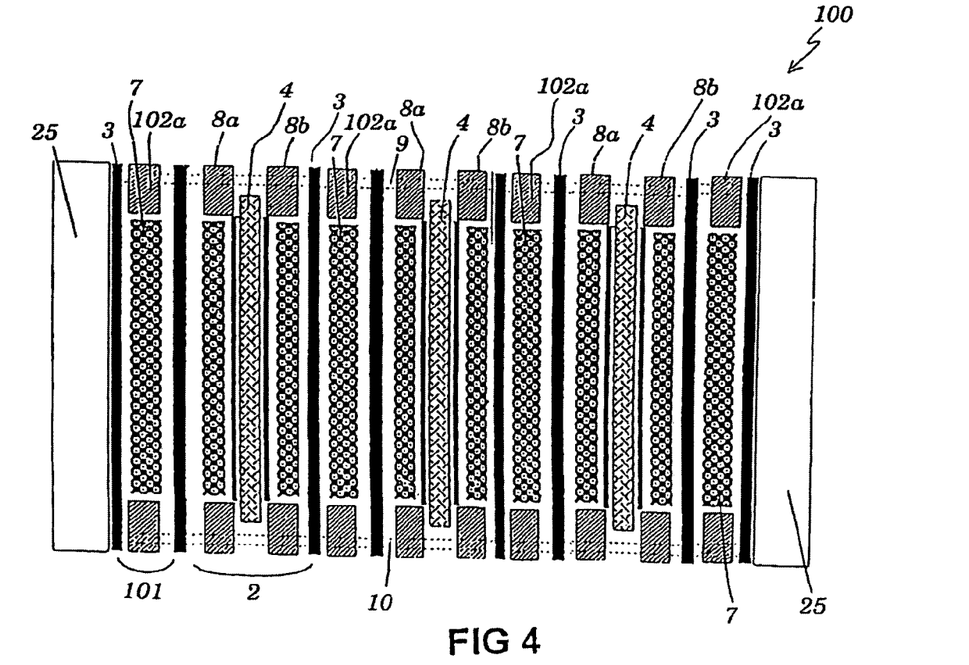
FIG. 4 shows an exploded side-view of a second embodiment of a membrane electrochemical generator according to the invention.

In FIG. 4, wherein the equivalent parts to those already illustrated making reference to FIGS. 1, 2 and 3 have been provided with the same reference numerals, a second embodiment of membrane electrochemical generator according to the invention is shown. The electrochemical generator 100 is entirely similar to the electrochemical generator 1 except that it comprises a multiplicity of additional cells 101, interposed between the reaction cells 2 in a 1:1 ratio.

Figures 5A, 5B:
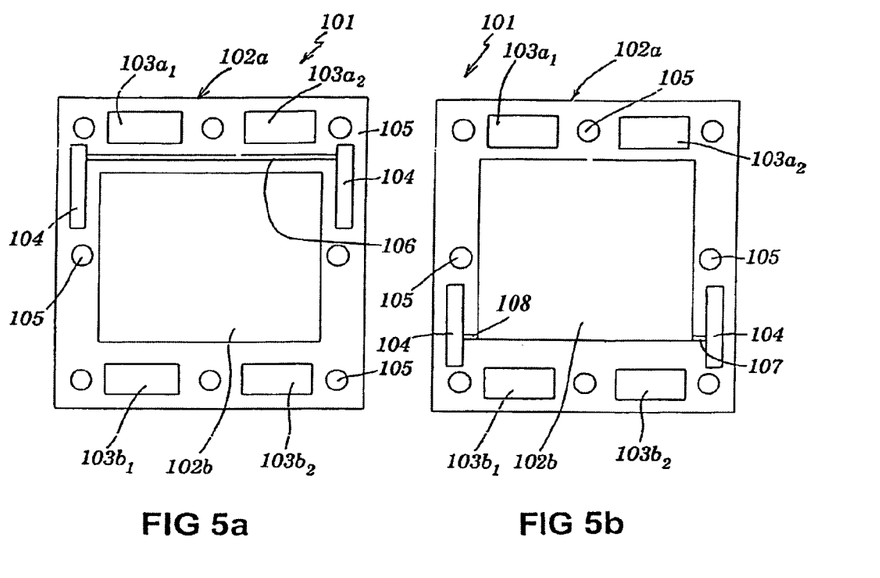
FIGS. 5a, 5b show front-views of two different embodiments of a component of the electrochemical generator of FIG. 4.

Making reference to FIG. 5a, the additional cells 101 have a substantially rectangular shape and dimensions equivalent to those of the reaction cells 2 and each comprises a perimetrical portion 102a, acting as the separating surface for the two gaseous reactants and a hollow central portion 102b to realise the seat of the current collector/distributor 7. The perimetrical portion 102a is provided with first and second upper openings $103a_1$, $103a_2$, first and second lower openings $103b_1$, $103b_2$ and side openings 104 placed in correspondence of the first and second upper openings $103a_1$, $103a_2$.

In a filter-press configuration, the first and the second upper openings $103a_1$, $103a_2$ of the additional cells 101 form, in conjunction with the first and the second upper openings $8a_1$, $8a_2$, $8b_1$, $8b_2$ of the anodic and cathodic sealing gaskets 8a, 8b which, in this case, have the same structure equivalent to that shown in FIG. 3b, and with the first and the second upper openings 12, 13 of the conductive bipolar plates 3, the two upper longitudinal ducts 18; the first and the second lower openings $103b_1$, $103b_2$ of the additional cells 101 form, in conjunction with the first and the second lower openings $8a_3$, $8a_4$, $8b_3$, $8b_4$ of the anodic and cathodic sealing gaskets 8a, 8b and with the first and the second lower openings 14, 15 of the conductive bipolar plates 3, the two lower longitudinal ducts 19. In their turn, the side openings 104 of the additional cells 101 form, in conjunction with the side openings $8a_5$, $8b_5$ of the anodic and cathodic sealing gaskets 8a, 8b and with the side openings 16 of the conductive bipolar plates 3 the side feeding ducts of the liquid water. The perimetrical portion 102a is also provided with a multiplicity of holes 105 for housing the tie-rods.

Furthermore, on both faces of the perimetrical portion 102a a fluid collection channel 106 is present, connected to the side openings 104 and positioned below the first and second upper openings $103a_1$, $103a_2$. In a filter-press configuration, the fluid collection channel 106 is in correspondence of the fluid injection calibrated holes 20 of the conductive bipolar plates 3.

Operatively, the stream of liquid water supplied through the side ducts of the electrochemical generator 100 flows in the fluid collection channel 106 and from here, through the fluid injection calibrated holes 20, is injected in the reactant streams entering the adjacent reaction cells 2.

As an alternative, the fluid collection channel 106 may be formed by two side portions 107, 108, connected with the side openings 104, the latter being obtained in correspondence of the first and second lower openings $103b_1$, $103b_2$ (FIG. 5b).

In this case, the stream of liquid water, prior to reaching the fluid injection calibrated holes 20 and being injected into the reaction cells 2, enters the two side portions 107, 108 of the fluid collection channel 106 to subsequently cross the whole surface of the current collector/distributor 7 of the additional cell 101 pre-heating counter-currently or concurrently with respect to at least one of the reactant flows entering the reaction cells 2. In this way, the additional cells 101 acts as cooling cells of the electrochemical generator 100.

Figure 6:
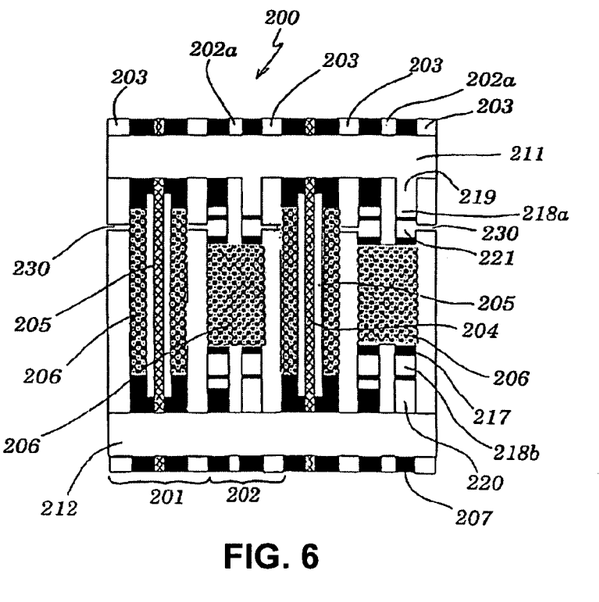
FIG. 6 shows a side-view of a portion of a third embodiment of a membrane electrochemical generator according to the invention.

FIG. 6 shows a cross-section of a third embodiment, according to the invention, of a membrane electrochemical generator. The electrochemical generator 200, only a portion of which is shown in FIG. 6, is formed by a multiplicity of reaction cells 201 and of additional cells 202 mutually connected in series and assembled according to a filter-press type configuration; each additional cell 202 being interposed between a pair of reaction cells 201.

More in detail, each reaction cell 201 is delimited by a pair of flat-face conductive bipolar plates 203 among which are comprised, proceeding outwards, a proton-exchange membrane 204; a pair of porous electrodes 205; a pair of current collector/distributors 206 electrically connecting the conductive bipolar plates 203 to the porous electrodes 205; a pair of sealing gaskets 207 directed to seal the periphery of the reaction cell 201 in order to avoid the leakage of the gaseous reactants.

Figure 7A:
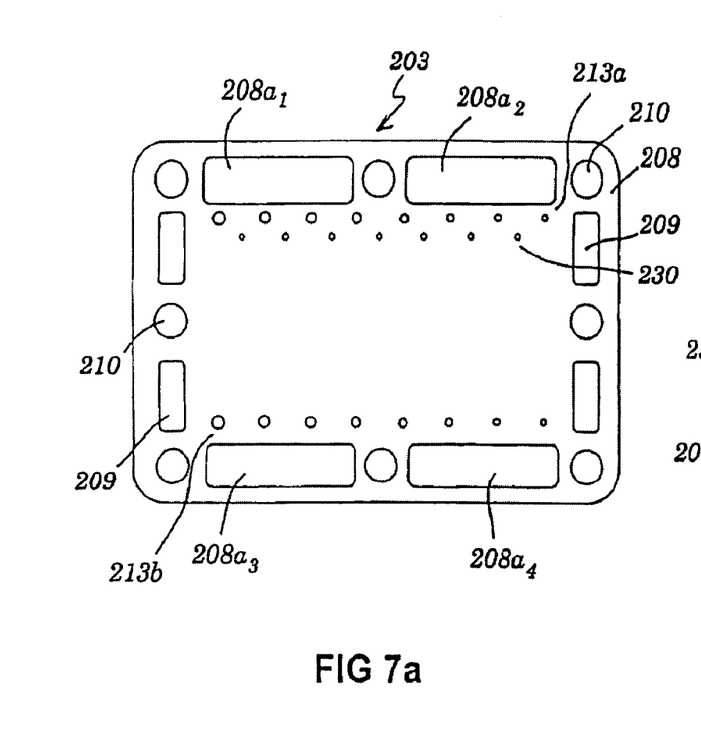
FIGS. 7a, 7b show front-views of a component of the electrochemical generator of FIG. 6.
Figure 7B:
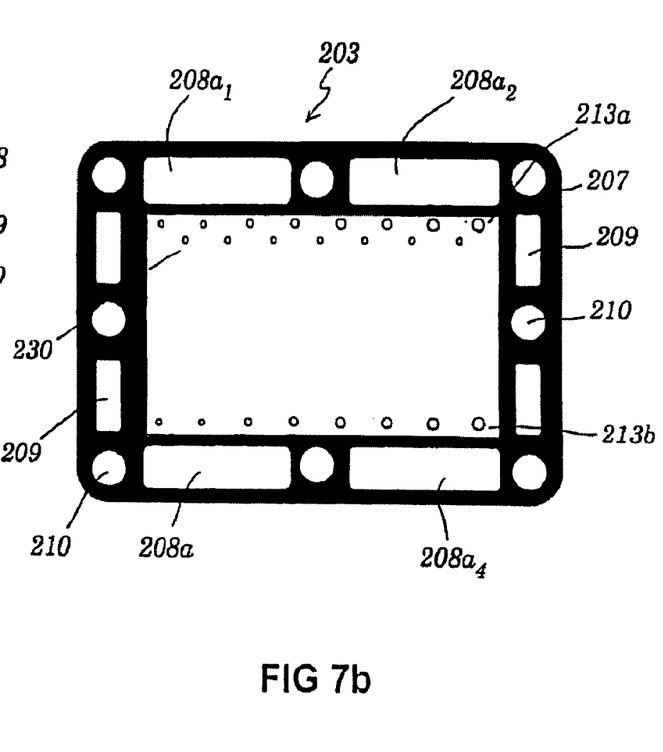

The conductive bipolar plates 203, shown in FIGS. 7a, 7b, have a substantially rectangular shape and a typical thickness of 0.1 mm to 0.4 mm. They present a perimetrical portion 208 provided with first and second upper openings $208a_1$, $208a_2$, first and second lower openings $208b_1$, $208b_2$ and side openings 209. The perimetrical portion 208 is also provided with a multiplicity of holes 210 for housing the tie-rods by means of which the tightening of the electrochemical generator 200 is achieved.

During the assemblage of the electrochemical generator 200, the coupling between the first and the second upper openings $208a_1$, $208a_2$ of all the conductive bipolar plates 203 determines the formation of two upper longitudinal ducts 211 while the coupling between the first and the second lower openings $208b_1$, $208b_2$ of all the conductive bipolar plates 203 determines the formation of two lower longitudinal ducts 212. The two upper longitudinal ducts 211, only one of which is shown in FIG. 6, define the feeding manifolds of the gaseous reactants (fuel and oxidant) while the two lower longitudinal ducts 212, only one of which is shown in FIG. 6, define the discharge manifolds of the reaction products mixed with the optional residual reactants. As an alternative, the lower longitudinal ducts 212 may be employed as feeding manifolds, and the upper longitudinal ducts 211 as discharge manifolds. It is also possible to feed one of the two gaseous reactants through one of the upper longitudinal ducts 211, using the correspondent lower longitudinal duct 212 for the discharge and feeding the other gaseous reactant through the other lower longitudinal duct 212 using the correspondent upper longitudinal duct 211 for the discharge.

Moreover, the coupling between the side openings 209 of all the conducive bipolar plates 203 determines the formation of side ducts, not shown in FIG. 6, for the passage of liquid water.

As shown in FIG. 7b, the sealing gaskets 207 are laid on just one face of each conductive bipolar plate 203 by (injection or compression) moulding, mechanical anchoring or gluing. They realise the seat of the current collector/distributors 206 besides delimiting the active area of the reaction cells 201.

In particular, the sealing gaskets 207 are obtained with a soft material, for instance silicone, elastomer, etc, and present a final thickness which can range from some tenth of a millimeter to a few millimeters.

Each conductive bipolar plate 203 is also provided with a multiplicity of upper calibrated holes 213a and of a multiplicity of lower calibrated holes 213b of diameter comprised between 0.1 mm to 5 mm. Through the multiplicity of upper calibrated holes 213a the gaseous reactants coming from the adjacent additional cell 202 flow, while through the multiplicity of lower calibrated holes 213b the reaction products and the residual reactants exit the reaction cell 201, as will be explained more in detail hereafter. The upper calibrated holes 213a are mutually aligned in order to ensure a homogeneous distribution of the gaseous reactants and are placed below the first and second upper openings $208a_1$, $208a_2$. In their turn, the lower calibrated holes 213b are mutually aligned and are placed above the first and second lower openings $208b_1$, $208b_2$. Both the upper 213a and lower 213b calibrated holes are spaced from the sealing gasket 207 by about 1 mm for better exploiting the active area of the reaction cell 201.

Furthermore, each conductive bipolar plate 203 is provided with a multiplicity of fluid injection calibrated holes 230, all having the same diameter(for example comprised between 0.2 mm to 1 mm), through which the liquid water coming from the adjacent additional cell 202 is injected into the reaction cell 201. The fluid injection calibrated holes 230 are mutually aligned in order to ensure a homogeneous distribution of liquid water and are placed below the upper calibrated holes 213a.

Figure 8A:
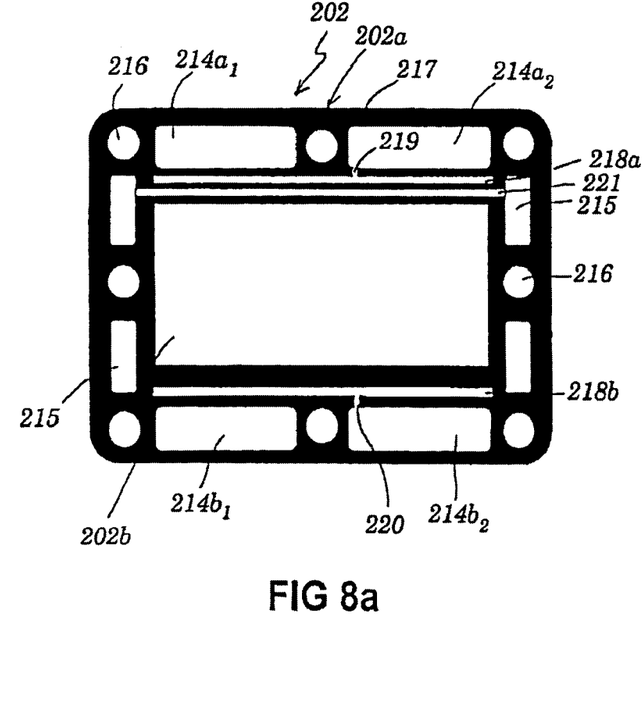
FIGS. 8a, 8b show front-views of a further component of the electrochemical generator of FIG. 6.
Figure 8B:
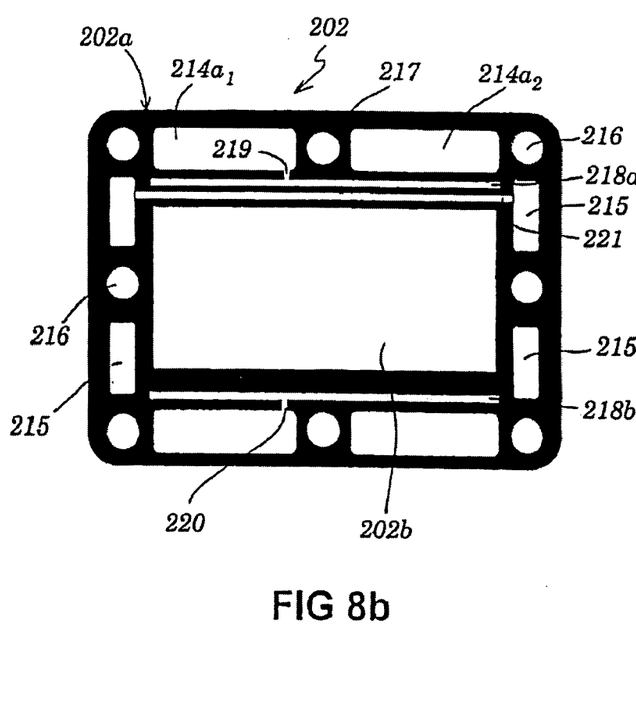

Making now reference to FIGS. 8a, 8b, each additional cell 202 has a substantially rectangular shape and dimensions equivalent to those of the reaction cell 201. Each additional cell 202 comprises a rigid perimetrical portion 202a, made of plastic or metal, acting as the separating surface for the two gaseous reactants and a hollow central portion 202b to realise the seat of the current collector/distributor 206. The rigid perimetrical portion 202a is provided with first and second upper openings $214a_1$, $214a_2$, first and second lower openings $214b_1$, $214b_2$ and side openings 215. In a filter-press configuration, the first and the second upper openings $214a_1$, $214a_2$ of the additional cells 202 form, in conjunction with the first and second upper openings $208a_1$, $208a_2$ of the conductive bipolar plates 203, the two upper longitudinal ducts 211, while the first and the second lower openings $214b_1$, $214b_2$ of the additional cells 202 form, in conjunction with the first and second lower openings $208b_1$, $208b_2$ of the conductive bipolar plates 203, the two lower longitudinal ducts 212. In their turn, the side openings 215 of the additional cells 202 form, in conjunction with the side openings 209 of the conductive bipolar plates 203 the feeding ducts of the liquid water. The rigid perimetrical portion 202a is also provided with a multiplicity of holes 216 for housing the tie-rods.

Moreover, each additional cell 202 comprises gaskets 217 which are laid on both faces of the rigid perimetrical portion 202a so that they define on each face of the perimetrical portion itself: a collection channel of the gaseous reactants 218a placed below the first and second upper openings $214a_1$, $214a_2$; a collection channel of the reaction products and the residual reactants 218b placed above the first and second lower openings $214b_1$, $214b_2$; a feeding channel 219 to connect one of the two upper openings $214a_1$, $214a_2$ to the collection channel of the gaseous reactants 218a; a discharge channel 220 to connect the collection channel of the reaction products and of the residual reactants 218b to one of the lower openings $214b_1$, $214b_2$; a fluid collection channel 221 placed below the collection channel of the gaseous reactants 218a and connecting the side openings 209. In a filter-press configuration, the collection channel of the gaseous reactants 218a is placed in correspondence of the upper calibrated holes 213a, the collection channel of the reaction products and of the residual reactants 218b is placed in correspondence of the lower calibrated holes 213b while the fluid collection channel 221 is placed in correspondence of the fluid injection calibrated holes 230. The gaskets 217 seal the collection channel of the gaseous reactants 218a, the collection channel of the reaction products and of the residual reactants 218b and the fluid collection channel 221 so as to hinder the passage of the gaseous reactants, of the reaction products and of the residual reactants and of liquid water inside the additional cell 202.

Moreover, the gaskets 217 are made of a soft material (silicone, elastomer etc.) compatible with the tightening/assemblage loads imposed by the sealing gaskets 207 of the reaction cell 201 and are laid on the rigid perimetrical portion 202a by (injection or compression) moulding, mechanical anchoring or gluing.

The electrochemical generator 200 operates as follows. The gaseous reactants (fuel and oxidant) supplied to the electrochemical generator 200 through the upper longitudinal ducts 211 flow in the collection channels of the gaseous reactants 218a through the feeding channels 219. From here, the gaseous reactants, being unable to flow within additional cells 202 since the collection channels of the gaseous reactants 218 are sealed by gaskets 217, pass through the multiplicity of upper calibrated holes 213a placed on the conductive bipolar plates 203 of the adjacent reaction cells 201. In this way, the gaseous reactants reach the active are of the reaction cells 201 where the effective reaction takes place.

In their turn, the reaction products and the residual reactants generated in the reaction cells 201 pass through the multiplicity of lower calibrated holes 213b placed on the conductive bipolar plates 203 of the same reaction cells reaching the collection channels of the discharge products 218b of the adjacent additional cells 202. From here, they exit the electrochemical generator 200 through the discharge channels 220.

Furthermore, according to the present invention, the stream of liquid water supplied through the side ducts of the electrochemical generator 200 flows in the fluid collection channels 221 and from here, through the fluid injection calibrated holes 230, is injected into the reactant streams entering the adjacent reaction cells 201 providing for the humidification of membrane 204 and for the thermal management of the electrochemical generator 200.

Figure 9A:
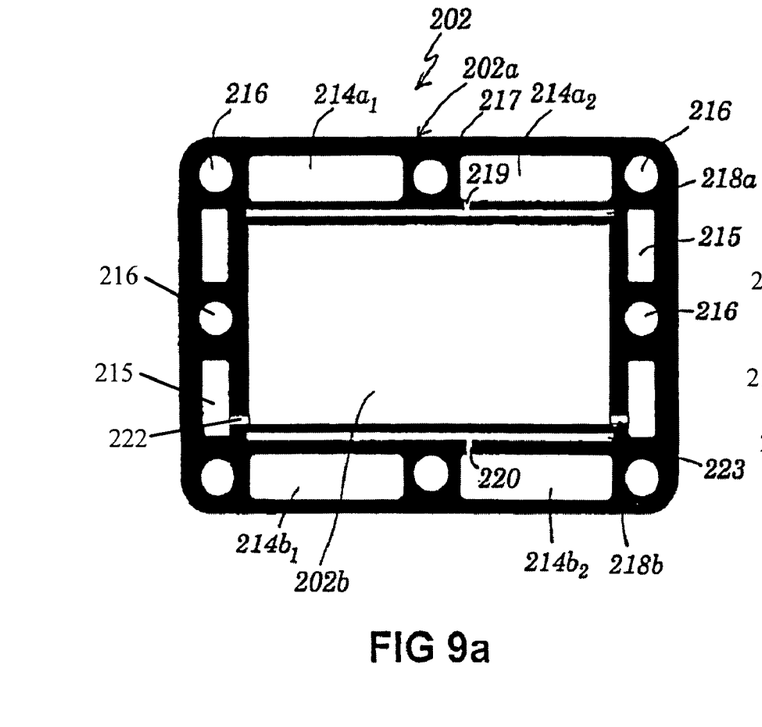
FIGS. 9a, 9b show front-views of a different embodiment of the component shown in FIGS. 8a and 8b.
Figure 9B:
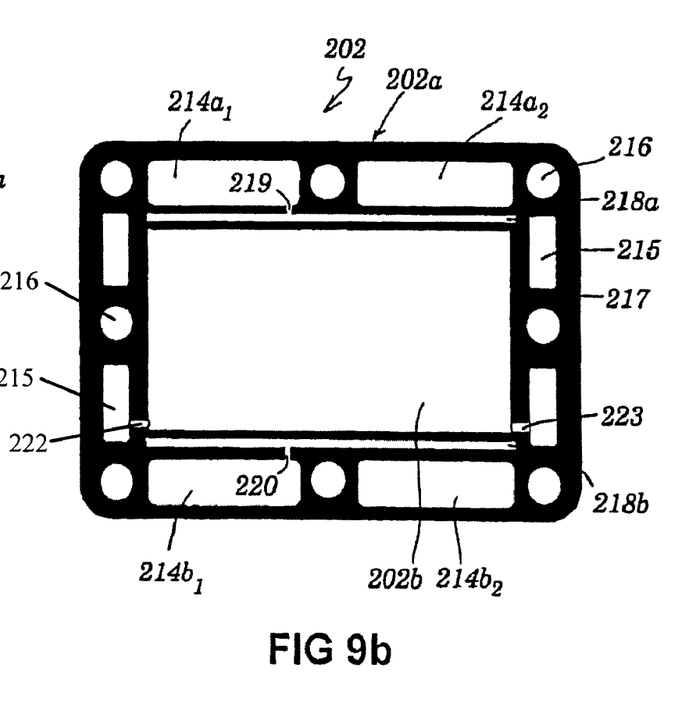

As an alternative to the fluid collection channel 221, the additional cell 202 may comprise two lateral fluid collection channels (222, 223) connected to the side openings 215 and placed below the collection channel of the discharge products 218b (FIGS. 9a, 9b).

In this case, the flow of liquid water, prior to reaching the fluid injection calibrated holes 230 and being injected into the reaction cells 201, enters through the two lateral fluid collection channels 222, 223 to subsequently cross the whole surface of the current collector/distributor 206 of the additional cell 202 pre-heating counter-currently or concurrently with respect to at least one of the reactant flows entering the reaction cells 201. In this way the additional cells 202 act as cooling cells of the electrochemical generator 200.

Figure 10A:
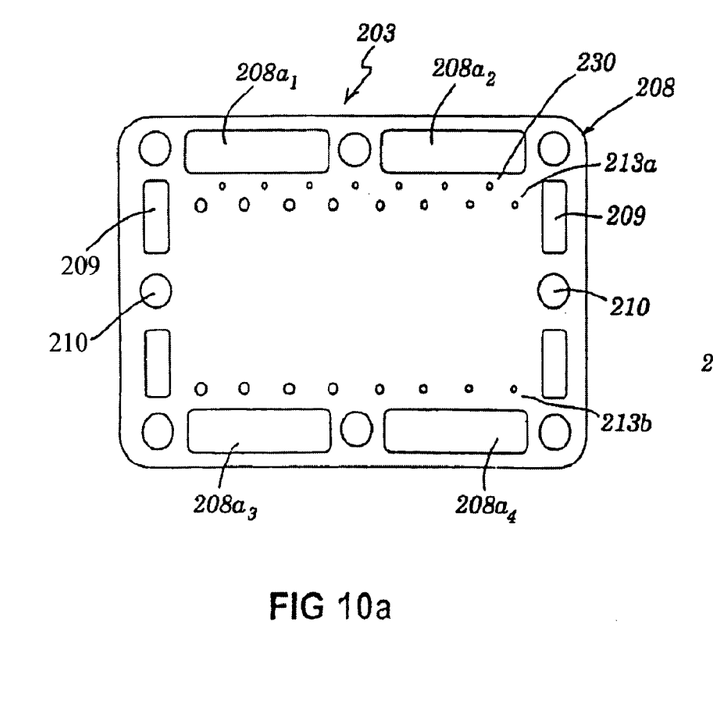
FIGS. 10a, 10b show front-views of a different embodiment of the component shown in FIGS. 7a and 7b.
Figure 10B:
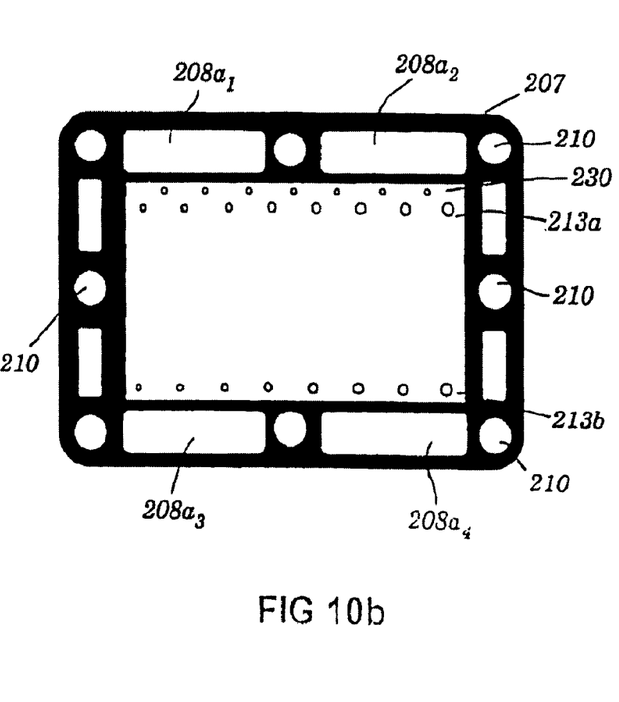
Figure 11A:
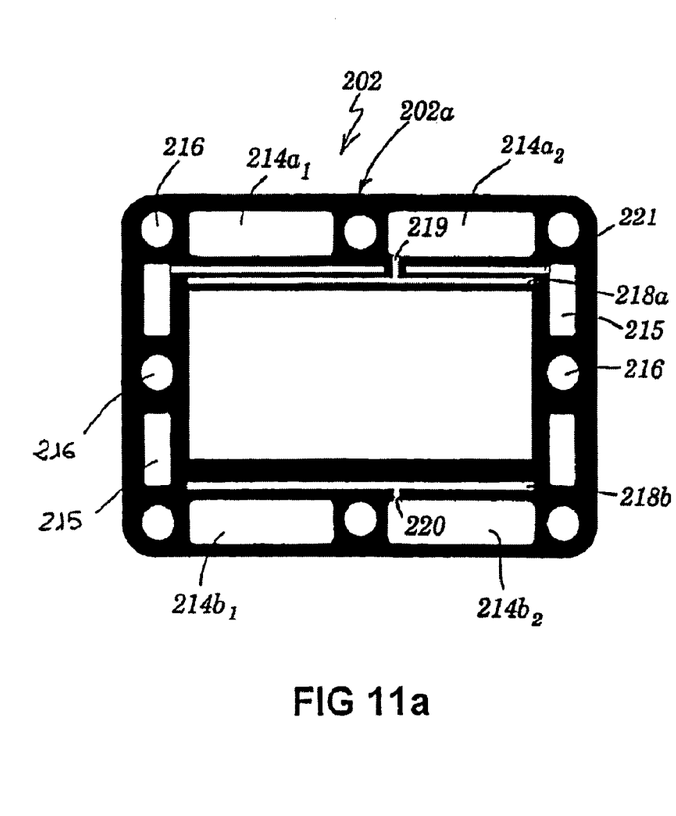
FIGS. 11a, 11b show front-views of a different embodiment of the component shown in FIGS. 8a and 8b.
Figure 11B:
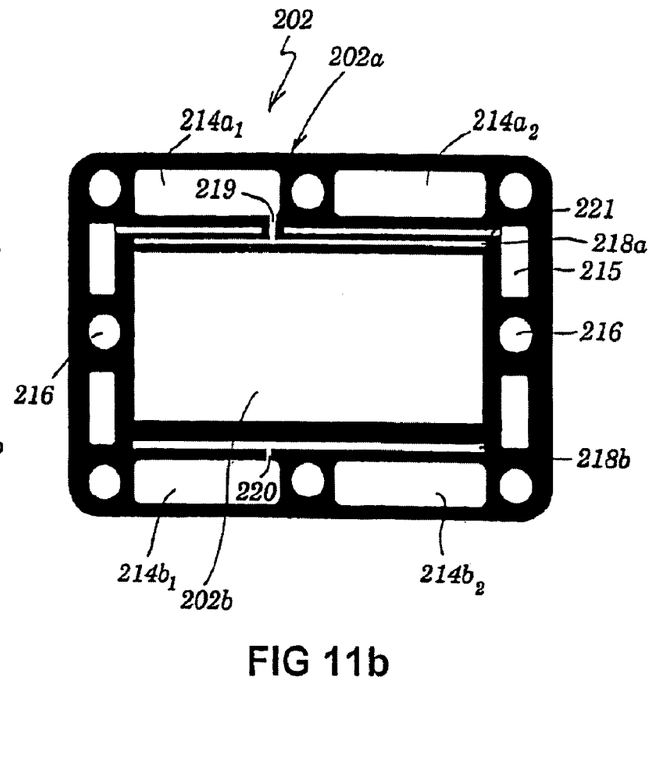

Moreover, as shown in FIGS. 10a, 10b, the fluid injection calibrated holes 230 of each conductive bipolar plate 203 may be placed above (rather than below) the upper calibrated holes 213a. In this case the fluid collection channel 221 is placed above the collection channel of the gaseous reactants 218a (FIGS. 11a, 11b).

Figure 12A:
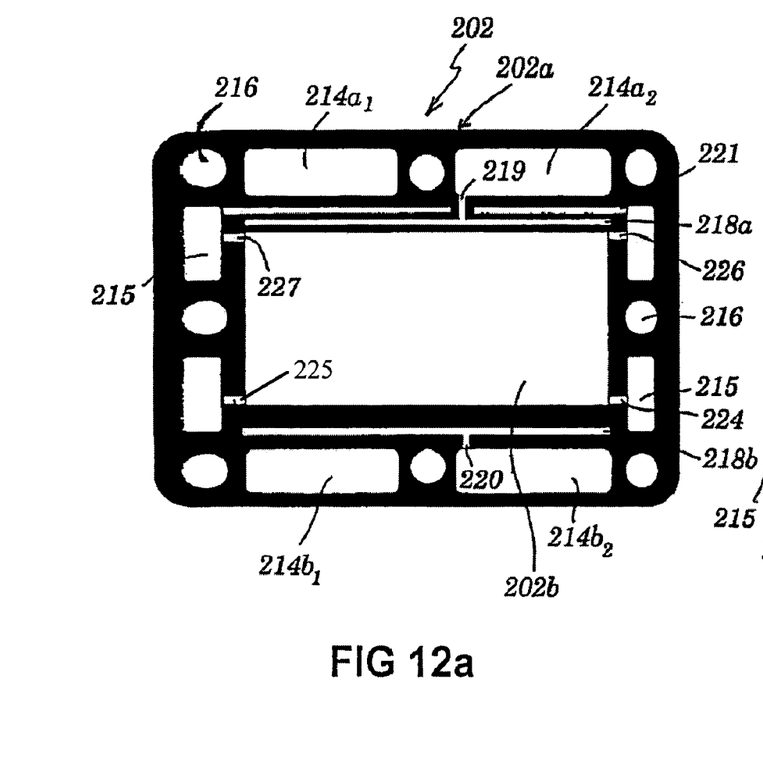
FIGS. 12a, 12b show front-views of a different embodiment of the component shown in FIGS. 9a and 9b.
Figure 12B:
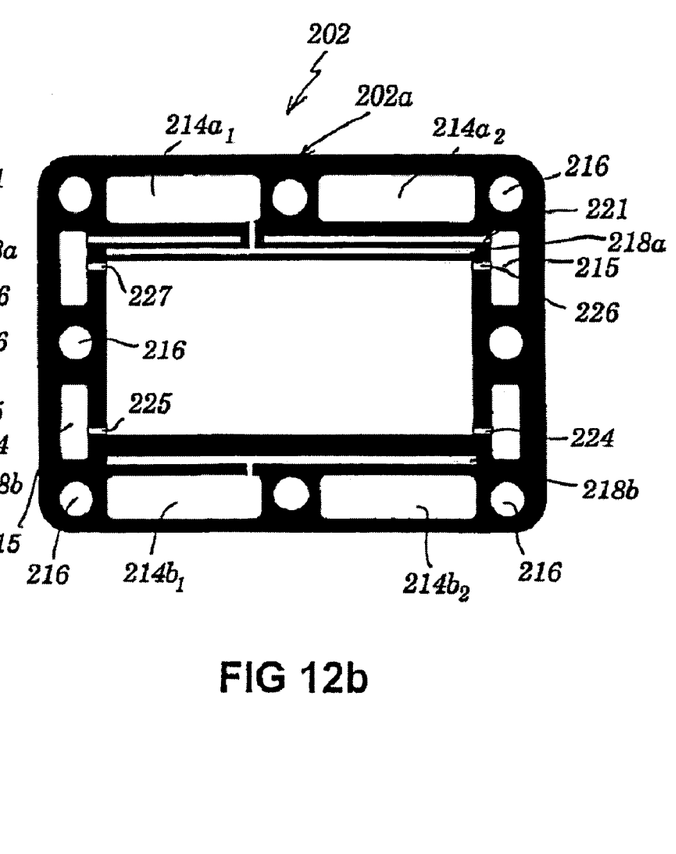

As an alternative, besides the fluid collection channel 221, the additional cell 202 may comprise a first and a second lateral channel 224, 225, placed above the collection channel of the discharge products 218b, and a third and a fourth lateral channel 226, 227 placed below the collection channel of the gaseous reactants 218a (FIGS. 12a, 12b).

In this case, the flow of liquid water, prior to reaching the fluid injection calibrated holes 230 and being injected into the reaction cells 201, enters the first and second lateral channel 224, 225 and exits from the third and fourth lateral channel 226, 227 crossing the current collector/distributor 206 of the additional cell 202 so that it is pre-heated counter-currently or concurrently with respect to at least one of the reactant streams supplied to the reaction cells 201.

The advantages obtainable with the above described electrochemical generators are the following.

First, the fluid injection calibrated holes 20, 230 permit to obtain a uniform distribution of the calibrated flow of liquid water inside the reaction cells 2, 201. In this way, the cooling of the electrochemical generators 1, 100, 200 as the hydration of the proton-exchange membranes 4, 204 result more uniform, with the effect of increasing the operative life of the same membranes besides enhancing the liquid water evaporative mechanism, thus decreasing the required flow-rate for the thermal management of the same generators.

Moreover, the liquid water flow pre-heating achieved by the use of the additional cells shown in FIGS. 5b, 9a, 9b and 12a, 12b amplifies the above disclosed advantages since it further enhances the liquid water evaporative mechanism allowing a further reduction of the time for reaching steady-state conditions at the start-up of the electrochemical generators 1, 100, 200.

It is finally evident that modifications and variations can be made to the described electrochemical generators, without departing from the domain of the present invention.

The invention claimed is:

1. A membrane electrochemical generator, comprising:
a multiplicity of reaction cells,
each said reaction cell comprises an anodic chamber and a cathodic chamber separated by a proton exchange membrane,
each said reaction cell is delimited by a pair of conductive bipolar plates, so that one of said pair of conductive bipolar plate is adjacent to the anodic chamber and the other of said pair of conductive bipolar plate is adjacent to the cathodic chamber,
each of said pair of conductive bipolar plates comprises a first planar side and a second planar side on the reverse side of the first planar side, and
at least one of said pair of conductive bipolar plates comprises a multiplicity of fluid injection calibrated holes, wherein one end of the calibrated hole opens to a source of water on the first planar side of said conductive bipolar plate and the other end of the calibrated hole opens to an adjacent chamber on the other second planar side of said conductive bipolar plate, so that the water flows from the first planar side of the bipolar plate through the calibrated hole to the adjacent chamber,
said anodic chamber and said cathodic chamber each has an electrically conductive reticulated element,
wherein the reticulated element is a tridimensional network of wires that electrically connects the conductive bipolar plates to the electrode and distributes a flow of gaseous reactants in the anodic chamber or the cathodic chamber where the reticulate material resides,
said electrochemical generator further comprising a multiplicity of cooling cells, each of the cooling cells being interposed between two reaction cells,
said cooling cell further comprising:
a perimetrical portion having a central hollow portion, side openings for the passage of said cooling fluid, at least one fluid collection channel connected to said side openings, feed openings for the passage of said flow of gaseous reactants, and discharge openings for discharging the reaction products and residual reactants; and
an electrically conductive reticulated element residing in the central hollow portion,
wherein a side channel fluidly connects the side opening with the hollow central portion, and
wherein said cooling fluid traverses the cooling cell prior to crossing said fluid injection holes into at least one adjacent reaction cell, pre-heating counter-currently or concurrently with respect to at least one gaseous flow entering said reaction cells.

2. A generator of claim 1,
wherein said cooling fluid partially evaporates inside the reaction cell, humidifying said flow of gaseous reactants inside the reaction cell and removing heat generated in the reaction from said membrane electrochemical generator.

3. A generator of claim 1, wherein said fluid injection calibrated holes are mutually aligned and placed in correspondence of feed openings for the passage of said flow of gaseous reactants, and of side openings for the passage of said cooling fluid,
wherein said side openings are in a perimetrical portion of said conductive bipolar plates.

4. A generator of claim 1, wherein said fluid injection calibrated holes have the same diameter, said diameter is between 0.2 mm to 1 mm.

5. A generator of claim 1, wherein said conductive bipolar plates are interposed between an anodic sealing gasket and a cathodic sealing gasket from two adjacent reaction cells,
said sealing gaskets comprise:
a hollow center portion wherein an electrically conductive reticulated element resides,
feed openings for the passage of said flow of gaseous reactants;
side openings for the passage of said cooling fluid; and
distribution channels to fluidly connect said feed openings to said electrically conductive reticulated element.

6. A generator of claim 5, wherein at least one of said sealing gaskets comprises fluid collection channels connected to said side openings,
said fluid collection channels are interposed between said feed openings and said distribution channels to collect said cooling fluid.

7. A generator of claim 6, wherein in a filter-press configuration said fluid collection channels present on at least one of the sealing gaskets are superposed to said fluid injection calibrated holes and that each of said fluid injection calibrated holes is in correspondence of a distribution channel obtained on the other sealing gasket.

8. A generator of claim 5, wherein at least one of said sealing gaskets comprises fluid collection channels connected to said side openings and to said distribution channels, said fluid collection channels are located between said feed openings and said distribution channels.

9. A generator of claim 1, wherein said fluid collection channel is located between said feed openings and said hollow central portion.

10. A generator of claim 1, wherein in a filter-press configuration said fluid collection channel s superposed to said fluid injection calibrated holes of said conductive bipolar plates.

11. A generator of claim 1, wherein said cooling fluid is liquid water.

12. A membrane electrochemical generator, comprising:
a multiplicity of reaction cells,
each said reaction cell comprises an anodic chamber and a cathodic chamber separated by a proton exchange membrane,
each said reaction cell is delimited by a pair of conductive bipolar plates, so that one of said pair of conductive bipolar plate is adjacent to the anodic chamber and the other of said pair of conductive bipolar plate is adjacent to the cathodic chamber,
each of said pair of conductive bipolar plates have a first planar side and a second planar side on the reverse side of the first planar side, and
at least one of said pair of conductive bipolar plates comprises a multiplicity of fluid injection calibrated holes, wherein one end of the calibrated hole opens to a source of water on the first planar side of said conductive bipolar plate and the other end of the calibrated hole opens to an adjacent chamber on the second planar side of said conductive bipolar plate, so that the water flows front the first planar side of the bipolar plate through the calibrated hole to the adjacent chamber,
said anodic chamber and said cathodic chamber each has an electrically conductive reticulated element,
wherein the reticulated element is a tridimensional network of wires that electrically connects the conductive bipolar plates to the electrode and distributes a flow of gaseous reactants in the anodic chamber or the cathodic chamber where the reticulate material resides,
wherein said conductive bipolar plates comprise a multiplicity of first calibrated holes for the passage of said flow of gaseous reactants and a multiplicity of second calibrated holes for the discharge of reaction products and of optional residual reactants,
and that said multiplicity of fluid injection calibrated holes are placed in correspondence of said multiplicity of first calibrated holes,
said membrane electrochemical generator further comprises a multiplicity of cooling cells, each of the cooling cells being interposed between two reaction cells and comprising a rigid perimetrical portion and a hollow central portion, said rigid perimetrical portion separates said flow of gaseous reactants from said hollow central portion in which an electrically conductive reticulated element resides,
wherein said rigid perimetrical portion is covered on each face by a gasket, said gasket defining on each face of said rigid perimetrical portion,
a zone for collecting said flow of gaseous reactants fluidly connects with said feed openings of said rigid perimetrical portion through a feed channel, and a zone for collecting the reaction products and the residual reactants fluidly connects with said discharge openings of said rigid perimetrical portion through a discharge channel,
wherein said fluid injection calibrated holes are located between said feed openings of said bipolar plates and said first calibrated holes, and
that said gasket defines on each face of said rigid perimetrical portion a fluid collection channel located between said feed openings of said cooling cell and said zone for collecting said flow of gaseous reactants.

13. A generator of claim 12, wherein said first calibrated holes are mutually aligned and placed in correspondence of feed openings of conductive bipolar plates, and that said second calibrated holes are mutually aligned and placed in correspondence of discharge openings on said perimetrical portion of said conductive bipolar plates.

14. A generator of claim 12, wherein said reaction cells comprise a sealing gasket covering only one face of said perimetrical portion of said conductive bipolar plates, said sealing gasket having a central hollow portion wherein an electrically conductive reticulated element resides.

15. A generator of claim 12, wherein said rigid perimetrical portion has feed openings for feeding said flow of gaseous reactants, discharge openings for discharging the reaction products and the residual reactants, and side openings for the passage of said cooling fluid.

16. A generator of claim 12 wherein said gasket seals said zone for collecting said flow of gaseous reactants and said zone for collecting the reaction products and the residual reactants so as to hinder the passage of said flow of gaseous reactants and of said reaction products and optionally residual reactants within said cooling cell.

17. A generator of claim 12, wherein in a filter-press configuration said zone for collecting said flow of gaseous reactants is superposed to said first calibrated holes and said zone for collecting the reaction products and the residual reactants is superposed to said second calibrated holes.

18. A generator of claim 12, wherein said fluid injection calibrated holes are located below said first calibrated holes and that said gasket defines on each face of said rigid perimetrical portion a fluid collection channel placed below said feed openings of said cooling cells.

19. A generator of claim 18, wherein in a filter-press configuration said fluid collection channel is superposed to said fluid injection calibrated holes.

20. A membrane electrochemical generator, comprising:
a multiplicity of reaction cells,
each said reaction cell comprises an anodic chamber and a cathodic chamber separated by a proton exchange membrane,
each said reaction cell is delimited by a pair of conductive bipolar plates, so that one of said pair of conductive bipolar plate is adjacent to the anodic chamber and the other of said pair of conductive bipolar plate is adjacent to the cathodic chamber,
each of said pair of conductive bipolar plates have a first planar side and a second planar side on the reverse side of the first planar side, and
at least one of said pair of conductive bipolar plates comprises a multiplicity of fluid injection calibrated holes, wherein one end of the calibrated hole opens to a source of water on the first planar side of said conductive bipolar plate and the other end of the calibrated hole opens to an adjacent chamber on the second planar side of said conductive bipolar plate, so that the water flows from the first planar side of the bipolar plate through the calibrated hole to the adjacent chamber, said anodic chamber and said cathodic chamber each has an electrically conductive reticulated element, wherein the reticulated element is a tridimensional network of wires that electrically connects the conductive bipolar plates to the electrode and distributes a flow of gaseous reactants in the anodic chamber or the cathodic chamber where the reticulate material resides, wherein said conductive bipolar plates comprise a multiplicity of first calibrated holes for the passage of said flow of gaseous reactants and a multiplicity of second calibrated holes for the discharge of reaction products and of optional residual reactants, and that said multiplicity of fluid injection calibrated holes are placed in correspondence of said multiplicity of first calibrated holes, said membrane electrochemical generator further comprises a multiplicity of cooling cells, each of the cooling cells being interposed between two reaction cells and comprising a rigid perimetrical portion and a hollow central portion, said rigid perimetrical portion separates said flow of gaseous reactants from said hollow central portion in which an electrically conductive reticulated resides, wherein said rigid perimetrical portion is covered on each face by a gasket, said gasket defining on each face of said rigid perimetrical portion, a zone for collecting said flow of gaseous reactants fluidly connects with said feed openings of said rigid perimetrical portion through a feed channel, and a zone for collecting the reaction products and the residual reactants fluidly connects with said discharge openings of said rigid perimetrical portion through a discharge channel, wherein said cooling cells comprise a first and a second fluid collection lateral channel connected to said side openings of said cooling cells and placed above said discharge openings of said cooling cells, and that said cooling fluid, prior to reaching said fluid injection holes, passes through said first and second fluid collection lateral channels to cross subsequently the whole surface of said electrically conductive reticulated element, pre-heating counter-currently or concurrently with respect to at least one gaseous flow entering said reaction cells.

21. A membrane electrochemical generator. comprising:

a multiplicity of reaction cells, each said reaction cell comprises an anodic chamber and a cathodic chamber separated by a proton exchange membrane, each said reaction cell is delimited by a pair of conductive bipolar plates, so that one of said pair of conductive bipolar plate is adjacent to the anodic chamber and the other of said pair of conductive bipolar plate is adjacent to the cathodic chamber, each of said pair of conductive bipolar plates have a first planar side and a second planar side on the reverse side of the first planar side, and at least one of said pair of conductive bipolar plates comprises a multiplicity of fluid injection calibrated holes, wherein one end of the calibrated hole opens to a source of water on the first planar side of said conductive bipolar plate and the other end of the calibrated hole opens to an adjacent chamber on the second planar side of said conductive bipolar plate, so that the water flows from the first planar side of the bipolar plate through the calibrated hole to the adjacent chamber, said anodic chamber and said cathodic chamber each has an electrically conductive reticulated element, wherein the reticulated element is a tridimensional network of wires that electrically connects the conductive bipolar plates to the electrode and distributes a flow of gaseous reactants in the anodic chamber or the cathodic chamber where the reticulate material resides, wherein said conductive bipolar plates comprise a multiplicity of first calibrated holes for the passage of said flow of gaseous reactants and a multiplicity of second calibrated holes for the discharge of reaction products and of optional residual reactants, and that said multiplicity of fluid injection calibrated holes are placed in correspondence of said multiplicity of first calibrated holes, said membrane electrochemical generator further comprises a multiplicity of cooling cells, each of the cooling cells being interposed between two reaction cells and comprising a rigid perimetrical portion and a hollow central portion, said rigid perimetrical portion separates said flow of gaseous reactants from said hollow central portion in which an electrically conductive reticulated resides wherein said rigid perimetrical portion is covered on each face by a gasket, said gasket defining on each face of said rigid perimetrical portion, a zone for collecting said flow of gaseous reactants fluidly connects with said feed openings of said rigid perimetrical portion through a feed channel, and a zone for collecting the reaction products and the residual reactants fluidly connects with said discharge openings of said rigid perimetrical portion through a discharge channel, wherein said cooling cells comprise:

a first and a second fluid collection lateral channel connected to said side openings of said of said cooling cells and placed above said discharge openings of said additional cells;

a third and a fourth fluid collection lateral channel connected to said side openings of said cooling cells and placed below said feed openings of said cooling cells;

a fluid collection channel located between said feed openings of said cooling cells and said zone for collecting said flow of gaseous reactants and connected to said side openings of said cooling cells;

said cooling fluid, prior to reaching said fluid injection holes enters through said first and second fluid collection lateral channel to subsequently cross the whole surface of said electrically conductive reticulated element, pre-heating counter-currently or concurrently with respect to at least one gaseous flow entering said reaction cells, wherein said cooling fluid subsequently exiting from said third and fourth fluid collection lateral channel; and in a filter-press configuration said fluid collection channel is superposed to said fluid injection calibrated holes.

* * * * *

UNITED STATES PATENT AND TRADEMARK OFFICE
CERTIFICATE OF CORRECTION

PATENT NO. : 7,666,536 B2
APPLICATION NO. : 10/517982
DATED : February 23, 2010
INVENTOR(S) : Eduardo Trifoni et al.

It is certified that error appears in the above-identified patent and that said Letters Patent is hereby corrected as shown below:

Claim 10, col. 11, line 10, "channel s superposed" should read --channel is superposed--.

Signed and Sealed this

Twenty-second Day of June, 2010

David J. Kappos
*Director of the United States Patent and Trademark Office*